E. R. GILL.

SELF ANSWERING SIGNAL SYSTEM.

APPLICATION FILED DEC. 13, 1910.

Reissued May 30, 1911.

13,248.

WITNESSES:

J. Wyatt Pepley.

Adele Hornigberg

INVENTOR

Edwin R. Gill

BY

Wilson & Hart

ATTORNEYS.

UNITED STATES PATENT OFFICE.

EDWIN R. GILL, OF YONKERS, NEW YORK, ASSIGNOR, BY MESNE ASSIGNMENTS, TO HOWARD E. MERRELL, OF NEW YORK, N. Y., AND ORLO J. HAMLIN, OF SMETHPORT, PENNSYLVANIA.

SELF-ANSWERING SIGNAL SYSTEM.

13,248. Specification of Reissued Letters Patent. Reissued May 30, 1911.

Original No. 934,908, dated September 21, 1909, Serial No. 472,024. Application for reissue filed December 13, 1910. Serial No. 597,168.

*To all whom it may concern:*

Be it known that I, EDWIN R. GILL, residing at Yonkers, in the county of Westchester and State of New York, have invented certain new and useful Improvements in Self-Answering Signal Systems, of which the following is a specification.

This invention relates broadly to signaling systems and in a more specific relation to such systems as are adapted to telephonic and train despatching work.

One of the prime objects of the invention is to provide means whereby upon the closing of a circuit to a local signal at a station distant from the sending station the operator at the sending station may be instantly apprised of the successful operation of the circuit closer.

Another object of the invention is to so arrange selective apparatus, a local signal and a line that upon the closing of the circuit through the local signal, answer back impulses will be inductively impressed upon the line, which impulses will audibly affect the receiver in the sending station.

I have shown my improvement in three illustrative modifications in the accompanying drawings each of the three figures of which is a diagram showing one form of the invention.

Figure 1:
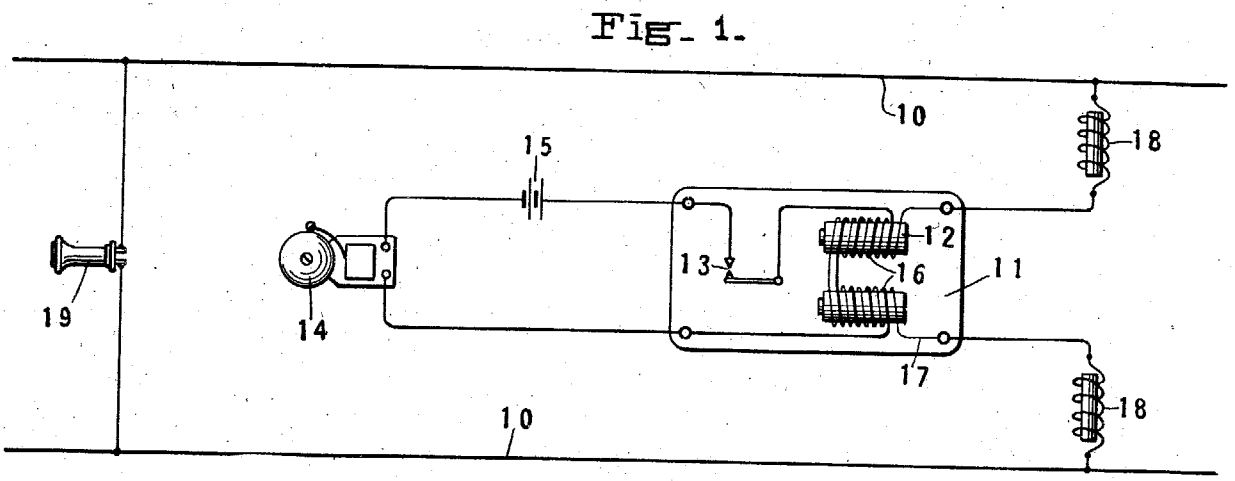

In Figure 1 the main line over which the signals are operated is indicated at 10, and at 11 is indicated the base of any desired form of selective circuit closer operated by an electromagnet shown in diagram at 12. My invention is not concerned with the details in this selective device, many forms of which are well known; and while the form shown in my Patent No. 906,523, dated December 15, 1908, is suitable for this purpose, I am not limited to use of this type of device. In Fig. 1 the circuit closer or switch whereby the local signal circuit is established is indicated in diagram at 13. This is operated by means controlled by the magnet 12.

The signal in the form shown is an ordinary bell 14, in series with a local battery 15, with the switch 13, and with a coil 16, on the magnet 12. The local circuit coil on the magnet is distinguished from the operating circuit 17 connected with the main line by the use of heavy lines to indicate the former and light lines for the latter.

It will be understood that words descriptive of the circuit for a local signal employed in this specification or in the accompanying claims are used in a broad sense, and may include a complete circuit from battery to battery or only such portion of a circuit as may include the coils of one or more of the various devices forming a portion of the system disclosed herein.

In some cases it may be found advantageous to place a reaction or choke coil 18, one or both sides of the local operating switch circuit, for the purpose of arresting rapidly undulating or oscillating currents such as those on telephone circuits and those due to lightning.

The operation of the answer back depends upon the inductive effect of the undulatory or interrupted current set up in the local signal circuit by direct action of the interrupter forming part of the signal as well as by the "kick back" of its magnet. This current, passing through the coils 16 which act as a primary, while the magnet itself acts as a converter core, set up by induction a corresponding alternating current in the main line, which can be distinctly perceived by means of a telephone 19, or other device sensitive to these currents. Where the choke coils 18 are used they should be so proportioned as to allow passage of the relatively slow undulations produced as above described, while at the same time preventing passage of such relatively high undulations as are produced in telephone circuits by talking or as are produced by lightning. Thus as long as the switch 13 remains closed, the buzzing will be heard at 19, whereby the operator knows that he has been successful.

Figure 2:
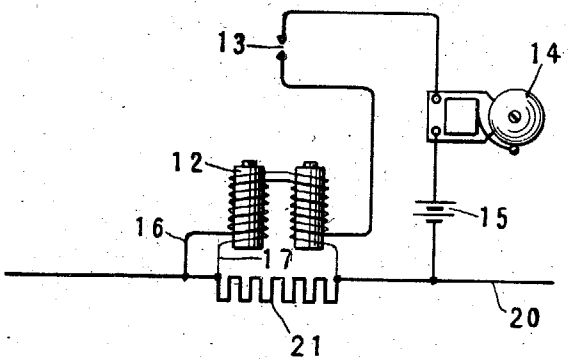

In Fig. 2 is shown, an arrangement for use where a number of signals are arranged in series on a single wire 20. In this case the non-inductive resistance 21 may or may not be used in shunt with the magnet circuit 17.

Figure 3:
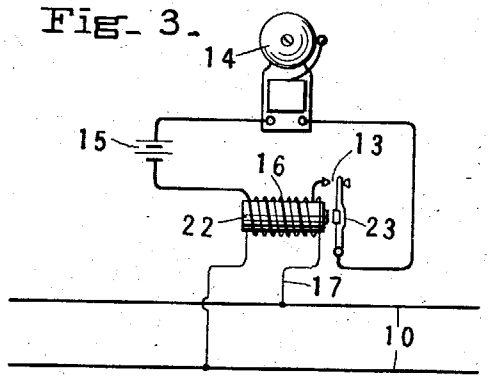

In Fig. 3 is shown a single magnet 22, adapted, when energized, to draw to it the armature 23 to close the signal circuit at 13. The same principle of answering back by induction from the coil 16 on the operating magnet is embodied here as in the forms shown.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent, is:—

1. A self-answering signal system comprising a main line, an electromagnet having coils connected to said main line, an electromagnetic signal device, an electric circuit for said signal device including one or more coils on said first named electromagnet, and a circuit changer for said last named circuit, arranged to be operated by energizing said magnet, substantially as described.

2. A self-answering signal system comprising a main line, a selective signal operator having an operating electromagnet whose coils are connected to said main line, an electromagnetic signal device, an electric circuit for said signal device including one or more coils on said electromagnet, and a circuit changer for said last named circuit, arranged to be operated by said selective signal operator, substantially as described.

3. A signaling system, comprising in combination, a main line, selective apparatus having coils connected to the main line, an electromagnetic signaling device, a circuit for said signaling device adapted to be closed by said selective apparatus, and answer back means operated by said signaling device adapted to transmit electric impulses to the main line through the connections of the selective apparatus therewith.

4. A signaling system, comprising in combination, a line, selecting means in bridge of said line, a local signal, a circuit for said local signal adapted to be directly closed by said selecting means, and means associated with said local signal adapted during the operation thereof to impress impulses of varying potential upon the line to produce an answer back signal, said impulses being transmitted to the line through the bridge of said selector, and answer back receiving means.

5. In a system of the class described, in combination, a main line, a local signal, a circuit for the local signal, a selector connected in bridge of the main line adapted when operated to close the circuit for the local signal, an answer back means associated with said local signal and said selector for impressing impulses upon the main line through the bridge of said selector, and answer back receiving means connected in the main line.

6. In a system of the class described, in combination, a main line, a selector connected in bridge of the main line, an electromagnetically operated local signal having a circuit adapted to be directly closed by said selector, the coils of the electromagnet of said local signal being operatively related to said bridge of the main line to impress a variable answer back current flow upon the main line through the bridge of said selector, and answer back receiving means connected in the main line.

In testimony whereof I affix my signature in the presence of two witnesses.

EDWIN R. GILL.

Witnesses:
A. S. Honigsberg,
M. A. Buscher.

Copies of this patent may be obtained for five cents each, by addressing the "Commissioner of Patents, Washington, D. C."